(12) United States Patent
Du Breuil (10) Patent No.: US 11,908,340 B2
(45) Date of Patent: Feb. 20, 2024

(54) MAGNIFICATION ENHANCEMENT OF VIDEO FOR VISUALLY IMPAIRED VIEWERS

(71) Applicant: ARRIS Enterprises LLC, Suwanee, GA (US)

(72) Inventor: Thomas L. Du Breuil, Ivyland, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 86 days.

(21) Appl. No.: 16/938,411

(22) Filed: Jul. 24, 2020

(65) Prior Publication Data

US 2021/0029306 A1    Jan. 28, 2021

Related U.S. Application Data

(60) Provisional application No. 62/878,206, filed on Jul. 24, 2019.

(51) Int. Cl.

| G09B 21/00 | (2006.01) |
|---|---|
| H04N 5/262 | (2006.01) |
| H04N 5/272 | (2006.01) |
| G06V 20/40 | (2022.01) |
| G06V 10/25 | (2022.01) |

(52) U.S. Cl.
CPC .......... G09B 21/008 (2013.01); G06V 10/25 (2022.01); G06V 20/41 (2022.01); H04N 5/2628 (2013.01); H04N 5/272 (2013.01)

(58) Field of Classification Search
CPC .. H04N 5/2628; H04N 5/272; H04N 21/4728; H04N 21/4316; H04N 5/44591; H04N 5/45; G09B 21/008; G06K 9/00718; G06F 2203/04805; G06F 2203/04806
See application file for complete search history.

(56) References Cited

U.S. PATENT DOCUMENTS

| 5,754,348 A * | 5/1998 | Soohoo ................. G06T 3/0018 |
|---|---|---|
| | | 359/436 |
| 6,704,034 B1 * | 3/2004 | Rodriguez ............ G06F 40/103 |
| | | 715/860 |
| 6,934,423 B1 * | 8/2005 | Clapper ................ G06T 3/4007 |
| | | 348/E5.055 |
| 8,106,927 B2 * | 1/2012 | Shoemaker ............. G06T 5/006 |
| | | 345/665 |
| 8,139,089 B2 * | 3/2012 | Doyle ................... G06T 3/0018 |
| | | 345/647 |

(Continued)

*Primary Examiner* — David N Werner
(74) *Attorney, Agent, or Firm* — Chernoff, Vilhauer, McClung & Stenzel, LLP (57) ABSTRACT

A method for modifying a video stream for display includes receiving a request to display a video stream in a display mode that facilitates viewing by visually impaired viewers. An unmodified region of interest (ROI) is identified in a current video frame of the video stream. A location of the unmodified ROI is tracked in each of the subsequent video frames. The unmodified ROI is magnified by a prescribed amount in at least some of the video frames in which the unmodified ROI is being tracked to produce a magnified ROI. For each of the video frames in which the unmodified ROI is being tracked and magnified, the magnified ROI is combined with at least a portion of the video frame in which the ROI is located to thereby produce a modified video stream.

18 Claims, 6 Drawing Sheets

(56) References Cited

U.S. PATENT DOCUMENTS

| | | | |
|---|---|---|---|
| 8,522,158 B2* | 8/2013 | Beck | G06F 40/189 715/800 |
| 10,194,112 B2* | 1/2019 | Baek | H04N 5/44 |
| 10,542,311 B2* | 1/2020 | Kandagal | H04N 21/42221 |
| 10,582,117 B1* | 3/2020 | Tanaka | G06K 9/3233 |
| 11,068,141 B1* | 7/2021 | Barton | H04N 5/2628 |
| 2003/0006995 A1* | 1/2003 | Smith | G06T 3/40 345/671 |
| 2004/0056899 A1* | 3/2004 | Sinclair, II | G06T 3/40 715/800 |
| 2007/0033544 A1* | 2/2007 | Fleisher | G06F 3/0481 715/800 |
| 2008/0266458 A1* | 10/2008 | Whittaker | H04N 21/440263 348/581 |
| 2009/0040238 A1* | 2/2009 | Ito | G06F 3/0481 345/660 |
| 2009/0087123 A1* | 4/2009 | Izawa | H04N 23/611 382/284 |
| 2009/0160997 A1* | 6/2009 | Oyama | H04N 5/349 348/340 |
| 2010/0026721 A1* | 2/2010 | Park | H04N 21/47 345/660 |
| 2010/0083186 A1* | 4/2010 | Zaman | G06F 3/0481 715/856 |
| 2010/0179691 A1* | 7/2010 | Gal | H04N 7/185 700/259 |
| 2010/0188579 A1* | 7/2010 | Friedman | H04N 21/42204 348/565 |
| 2010/0287493 A1* | 11/2010 | Majumder | G06F 3/0481 715/788 |
| 2011/0043644 A1* | 2/2011 | Munger | H04N 5/23296 348/207.1 |
| 2011/0304772 A1* | 12/2011 | Dasher | H04N 21/4728 348/581 |
| 2012/0218307 A1* | 8/2012 | Lin | G06F 3/0482 345/660 |
| 2014/0176554 A1* | 6/2014 | Cohen | G06T 7/0012 345/428 |
| 2015/0350565 A1* | 12/2015 | Rapport | H04N 19/132 348/581 |
| 2016/0321514 A1* | 11/2016 | Kahle | G06K 9/183 |
| 2016/0349970 A1* | 12/2016 | Everitt | G06T 3/40 |
| 2016/0381297 A1* | 12/2016 | Alsheuski | H04N 5/23238 348/36 |
| 2017/0206417 A1* | 7/2017 | Aoyama | H04L 1/0061 |
| 2018/0063482 A1* | 3/2018 | Goesnar | H04N 5/2259 |
| 2018/0098018 A1* | 4/2018 | Cho | H04N 5/44591 |
| 2018/0262708 A1* | 9/2018 | Lee | H04N 21/4312 |
| 2018/0275856 A1 | 9/2018 | Apitz | |
| 2018/0285648 A1 | 10/2018 | Pan | |
| 2019/0012761 A1 | 1/2019 | Risinger | |
| 2019/0034734 A1 | 1/2019 | Yen | |
| 2019/0286305 A1* | 9/2019 | Sevenster | G16H 30/40 |
| 2020/0014961 A1* | 1/2020 | Ramaswamy | H04N 21/440263 |
| 2020/0304754 A1* | 9/2020 | Huynh Thien | H04N 7/0122 |
| 2020/0351543 A1* | 11/2020 | Kerofsky | H04N 21/44008 |
| 2021/0240988 A1* | 8/2021 | Lim | A61F 9/08 |
| 2021/0358182 A1* | 11/2021 | Ward | G06V 10/25 |

\* cited by examiner

MAGNIFICATION ENHANCEMENT OF VIDEO FOR VISUALLY IMPAIRED VIEWERS

CROSS REFERENCE TO RELATED APPLICATIONS

The present application claims priority under 35 U.S.C. § 119(e) to U.S. Provisional Application No. 62/878,206.

BACKGROUND

A visually impaired person many not be able to get the full benefits of audio visual media such as video content presented on a television. Currently, television broadcast streams may include a number of different audio channels, representing, for instance, a number of different languages, as well as an additional audio descriptor component, which provides an audio description of the corresponding video component in the broadcast stream. With such an arrangement, a visually impaired viewer can scroll through a menu of the various audio channels on the television display providing an indication of the selected mode, for instance specifying "English", "Spanish", "Audio Description". By selecting the "Audio Description" channel the viewer will receive the audio description of the corresponding video component. However, this audio description does not assist the visually impaired viewer in better seeing the actual video that is being presented.

SUMMARY

In accordance with one aspect of the subject matter described herein, a method for modifying a video stream for display on a display device includes receiving a request at a vision enhancement system to display a video stream in a display mode that facilitates viewing by visually impaired viewers. An unmodified region of interest (ROI) is identified in a current video frame of the video stream. A location of the unmodified ROI is tracked with the vision enhancement system in each of the video frames of the video stream subsequent to the current frame. The unmodified ROI is magnified with the vision enhancement system by a prescribed amount in at least some of the video frames in which the unmodified ROI is being tracked to produce a magnified ROI corresponding to an unmodified ROI. For each of the video frames in which the unmodified ROI is being tracked and magnified, the magnified ROI is combined with at least a portion of the video frame in which the ROI is located to thereby produce a modified video stream. The modified video stream is caused to be presented on a display device by the vision enhancement system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

As detailed below, in some embodiments methods and systems are provided which can automatically track and magnify a region of interest (ROI) in a video program or other video content. The ROI may be manually identified by the user or it may be automatically identified. In addition to magnifying the ROI, the ROI may undergo additional visual enhancements such as increasing the brightness, color gamut and/or contrast of the ROI. By magnifying the ROI, which will often be the most important part of the image, the viewability of the video for visually impaired users can be increased.

The video content to which the techniques described herein are applied may be received in various ways. For example, consumers may receive video content through a rendering client connected to a service provider network. The service provider network may be a traditional video distribution network such as a cable network (e.g., a QAM-based distribution system), a direct broadcast satellite (DBS) network, an over-the air network or a telecommunications network. In these examples the rendering client receiving the video content may be a set top box. Alternatively, the video content may be received over a content delivery system that uses an Internet Protocol (IP) for video content delivery. In one example, the IP delivery mechanism may be adaptive bit rate (ABR) streaming, which breaks the overall media stream into a sequence of small file downloads, each of which load one short segment, or chunk, of an overall potentially unbounded content stream. In this example the rendering client may be any suitable ABR client. In general, examples of rendering clients include, without limitation, a television converter, a set-top box, television receiving device, television receiver, television recording device, satellite set-top box, satellite receiver, cable receiver, media player, and a digital video recorder (DVR) and a DVD or Blu-ray player.

Figure 1:
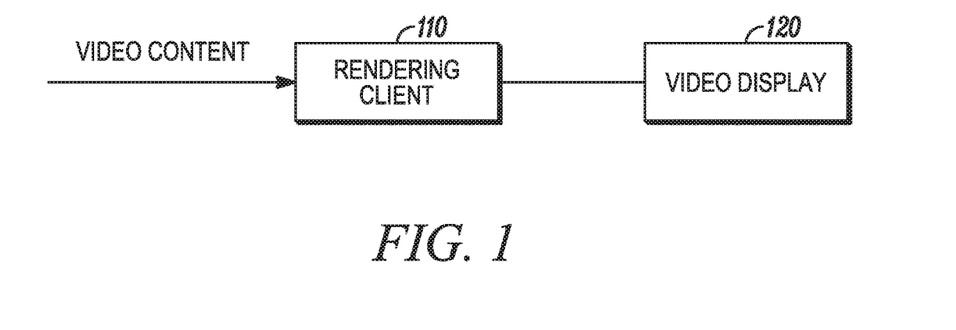
FIG. 1 shows a simplified functional block diagram of one example of an arrangement in which a consumer receives video content at a rendering client for presentation on a display device.

FIG. 1 shows a simplified functional block diagram of one example of an arrangement in which a consumer receives video content on a rendering client 110 using any of the illustrative aforementioned mechanisms. The rendering client 110, in turn, may deliver the video content to a display device over any of a variety of standard video interface connections. Examples of the display devices may include, but are not limited to: a television (TV), a personal computer (PC), a computer monitor, smartphone, mobile device, tablet device, game system, or the like. In some embodiments the rendering client and the display device may be integrated into a single device. Such a single device may have the above-described functionality of the rendering client and the display device.

In some implementations, the video connection between the rendering client and the display device can be made using one or more physical cables or some other physical connection. Depending on the type of rendering client, the number, types, and formats of signals, the cables may include a variety of standard configurations, including but not limited to: video component cables, Bayonet Neill Concelman (BNC) connectors, coaxial cables, Video Graphics Array (VGA) connectors, RCA connectors, Sony/Philips Digital Interface (S/PDIF), Universal Serial Bus (USB), FireWire., Ethernet cables, RJ45 connectors, phone jacks, Digital Video Interface (DVI), High-Definition Multimedia Interface (HDMI), etc. In other implementations, the video connection can be made over a wired and/or wireless local-area-network that employ one or more protocols such as Ethernet, Wi-Fi (i.e., IEEE 802.11), Multimedia over Coax (MoCA) and power-line communication technologies, for example.

The video content may be received by the rendering client in any predetermined format such as an MPEG media format in which the video content is incorporated in an MPEG transport stream. Alternatively, the video content may be arranged in accordance with other media formats including but not limited to Hypertext Markup Language (HTML), Virtual Hypertext Markup language (VHTML), X markup language (XML), H.261, or H.263 formats, as well as adaptive bit rate streaming formats including HTTP Live Streaming ("HLS") by Apple, Inc., and HTTP Smooth Streaming by Microsoft, Inc. and ISO/IEC 23009-1, Information Technology—Dynamic Adaptive Streaming over HTTP ("DASH").

Figure 2:
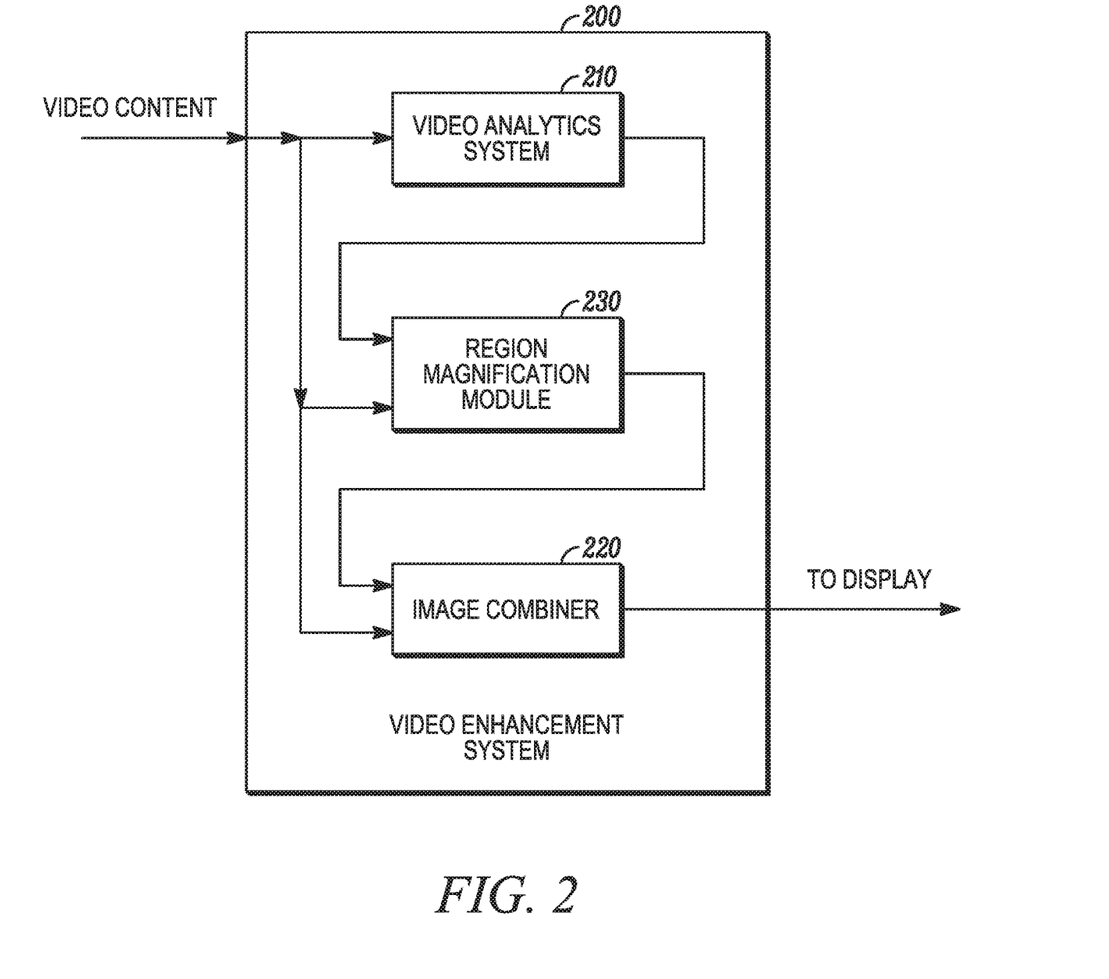
FIG. 2 shows a simplified functional block diagram of one example of a vision enhancement system that may be used to automatically track and magnify a region of interest (ROI) in a video program.

FIG. 2 shows a simplified functional block diagram of one example of a vision enhancement system 200 that may be used to automatically track and magnify a ROI in a video program received or stored in the rendering client. Accordingly, in some embodiments the vision enhancement system 200 may be a subsystem incorporated in the rendering client or the display device or it may be an independent system that receives a video stream from the rendering client.

Vision enhancement system 200 includes a video analytics system 210, a region magnification module 220 and an image combiner 230 that each receive a copy of the incoming video stream. The video analytics system 210 is used to track a ROI that it either automatically identified by the system or which is manually identified by the user. Upon identifying the ROI, or receiving user input that specifies the ROI the video analytics system 210 outputs a signal that identifies the ROI, which is input to the region magnification module 220. The region magnification module 220, in turn magnifies the ROI by a predetermined amount, which may be, in some embodiments, a default magnification factor or a user specified magnification factor. Examples of these components of the vision enhancement system will be presented below for purposes of illustration only and not as a limitation on the techniques described herein.

Video analytics system 210 may operate in accordance with well-known video content analysis (VCA) techniques, which are conventionally used, for example, to detect events of interest in video obtained from security cameras, analysis of pre-recorded video for the purpose of extracting events occurring over a long period of time, and many other tasks that require situational awareness (e.g., understanding customer behavior, etc). The video analytics system 210 may use currently available technology that is able to accurately recognize and track objects. This technology is often used in modern video cameras, for example, which can automatically determine where to focus by finding the face(es) in the image area, and which may even determine when the person is smiling. And this same technology has proven adept at tracking moving subjects such as a person running along a beach or hockey players skating after the puck.

Figure 3:
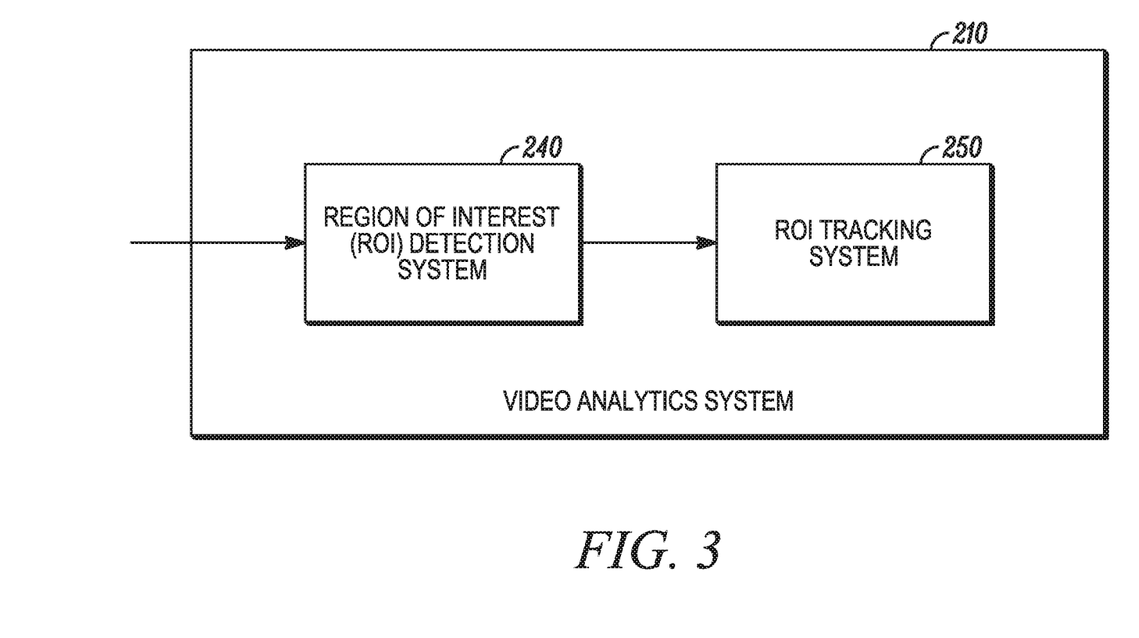
FIG. 3 is a simplified functional block diagram of one example of the video analytics system.

FIG. 3 is a simplified functional block diagram of one example of the video analytics system 210, which includes a ROI detection system 240 that receives the incoming video stream and an object tracking system 250 that receives the output from the ROI detection system 240.

The ROI detection system 240 can detect one or more ROIs in the video frames of the video stream, and the ROI tracking system 250 can track the one or more ROIs across the frames of the video stream. As used herein, a ROI may refer to foreground pixels of at least a portion of an object (e.g., a portion of an object or an entire object) in a video frame. For example, a ROI can include a contiguous group of pixels making up at least a portion of a foreground object in a video frame. In another example, a ROI can refer to a contiguous group of pixels making up at least a portion of a background object in a video frame. In an embodiment in which the ROI detection system 240 is used to identify foreground moving objects as a ROI, the ROI detection system 240 may segment moving objects from the global background in a scene by using a background subtraction engine to perform background subtraction to detect foreground pixels in one or more of the video frames. Based on the results of background subtraction, a morphology engine can perform foreground pixel processing to group the foreground pixels into foreground ROIs for tracking purposes. Such techniques for detecting ROIs are well-known and thus do not need to be discussed in further detail.

Once a ROI is detected and processed, ROI tracking can be performed to track the detected ROI. The input to the ROI tracking system 250 is a list of the ROIs (if there is more than one ROI), specified, for instance, by suitable bounding boxes, generated by the ROI detection system 104. In some cases the ROIs may each be assigned a unique ID. Tracking of the ROI may be accomplished in a variety of different ways. In one illustrative embodiment, the ROI tracking system 250 may predict the location of the ROI in a current frame based on information from a previous frame. This can be accomplished by first predicting the ROIs location and then use measurements to correct or update the location. In this case, the ROI tracking system 250 predicts the location in the current frame from the last frame location, and when the current frame is received, the ROI tracking system 250 first uses the measurement of the ROI (e.g., the ROI bounding box) to correct its location and then predicts its location in the next frame. For example, a ROI tracking system can employ a filter (e.g., a Kalman filter) to measure its trajectory as well as predict its future location(s). Additionally, if the source video is compressed with a technology such as those defined by the Motion Picture Experts Group (MPEG) specifications, which incorporates motion estimation and prediction in its algorithm, the ROI tracking system can leverage these existing motion vectors embedded in the compressed video source, potentially simplifying the processing resources needed to track the ROI from frame to frame.

As previously mentioned, ROIs may be initially identified manually by the user or automatically by the video analytics system 210. In the case of automatic detection, some embodiments may employ machine learning techniques to identify and/or localize objects in an image. In one example, a system using a trained neural network can be used to identify objects in an image based on past information about similar objects that the network has learned based on training data. In one illustrative example, training data can include both images and labels of objects that are used to train the network. Many examples of neural networks are available, including convolutional neural networks (CNNs), autoencoders, deep belief nets (DBNs), Recurrent Neural Networks (RNNs), among others. If the video analytics system 210 performs ROI classification as well as ROI identification, the output from the system may include probability values indicating probabilities that the ROI includes different classes of objects (e.g., a probability the object is a person, a probability the object is a dog, a probability the object is an automobile, or the like).

In those embodiments in which the video analytics system 210 is used to automatically identify a ROI, a predetermined list of object classes may be provided which specifies and possibly prioritizes objects that are to be recognized as ROIs. In some cases ROIs whose classification is not on the list or is unknown may be ignored and hence will not be magnified by the magnification module 220 of the vision enhancement system 200. For instance, by way of example, an ROI that is classified as a person's face may be given highest priority since it is likely the most pertinent portion of the video. When one or more people are in the frame, especially if they are talking, their faces are likely the most relevant area that should undergo magnification. Likewise, rapidly moving objects may be given relatively high priority as ROIs. In this way, for instance, in a video program of a football game, the video analytics system can treat the ball as a ROI and hence track it when it is put into play. Further, by tracking the ball and people in the scene, the video analytics system can treat the line of scrimmage, centered on the center and quarterback, as a ROI that will subsequently be magnified for the viewer. Once again, machine learning techniques may be used to train the video analytics system to identify and track suitable ROIs in various contexts such as sporting events, for example. The machine learning techniques may also use the corresponding audio component of the video stream to facilitate ROI identification and classification.

Returning again to the vision enhancement system 200 of FIG. 2, the output from the video analytics system 210 (e.g., the output from the ROI tracker 250 in FIG. 3) specifies the current location of the identified ROI in each frame of the video stream and provides it to the region magnification module 230 shown in FIG. 2. Given both the video stream and the location of the ROI in the video stream, the magnification module 230 is able to magnify the ROI by a predetermined amount or by an amount specified by the viewer. For instance, in some embodiments the ROI may be magnified by a default amount, which can then be overridden by the viewer if desired. Thus, the magnification module 230 will typically access, store, or be provided with, parameters defining the magnification level. This parameter may be defined for each viewer as a settable parameter, or default values may be used. By way of example, in some embodiments the viewer may be allowed to select a magnification level within a specified range of values e.g., 1.1-8 times normal.

Typically, the image data in the ROI is processed by the magnification module 230 to create a magnified image. In some embodiments, magnification may require interpolation of pixels using an algorithm, or merely duplication of existing pixels in an area. In some embodiments, the video stream may have sufficient image density so as to allow presentation of a magnified image without loss of image data. For example, the video stream provided to the system may be a very high-quality encoded video stream, such as a 4k video stream having, for instance, 4096×2160 pixels of video information per video frame. However, the video monitor may provide a lower resolution, such as a high definition TV having 1920×1080 pixels resolution. Thus, in the case of a 4k video stream that is to be magnified by a factor of 4, the "magnification" that occurs in the ROI actually may still produce a high-quality image at the full resolution of the viewer's display device. In other embodiments, the unprocessed video provided to viewers can be a down sampled version of the higher resolution encoding. Thus, the same effect can be accomplished by either magnifying a portion of a video and presenting it to the viewer in the ROI, or presenting an unmodified portion of the video in the ROI and down sampling the other portion of the video that is normally presented to the viewer. Those skilled in the art will recognize that various algorithms can be used to create the effect of zooming the image data in the ROI.

The image combiner 220 receives the magnified ROI from the magnification module 230 and the original streaming video. The image combiner 220 combines or merges the two video streams to provide a single output stream 225 that may be presented on the display. The image combiner 220 takes the magnified ROI on a frame-by frame basis and processes that pixel content to replace the corresponding portion of the unmodified video stream.

Figure 4:
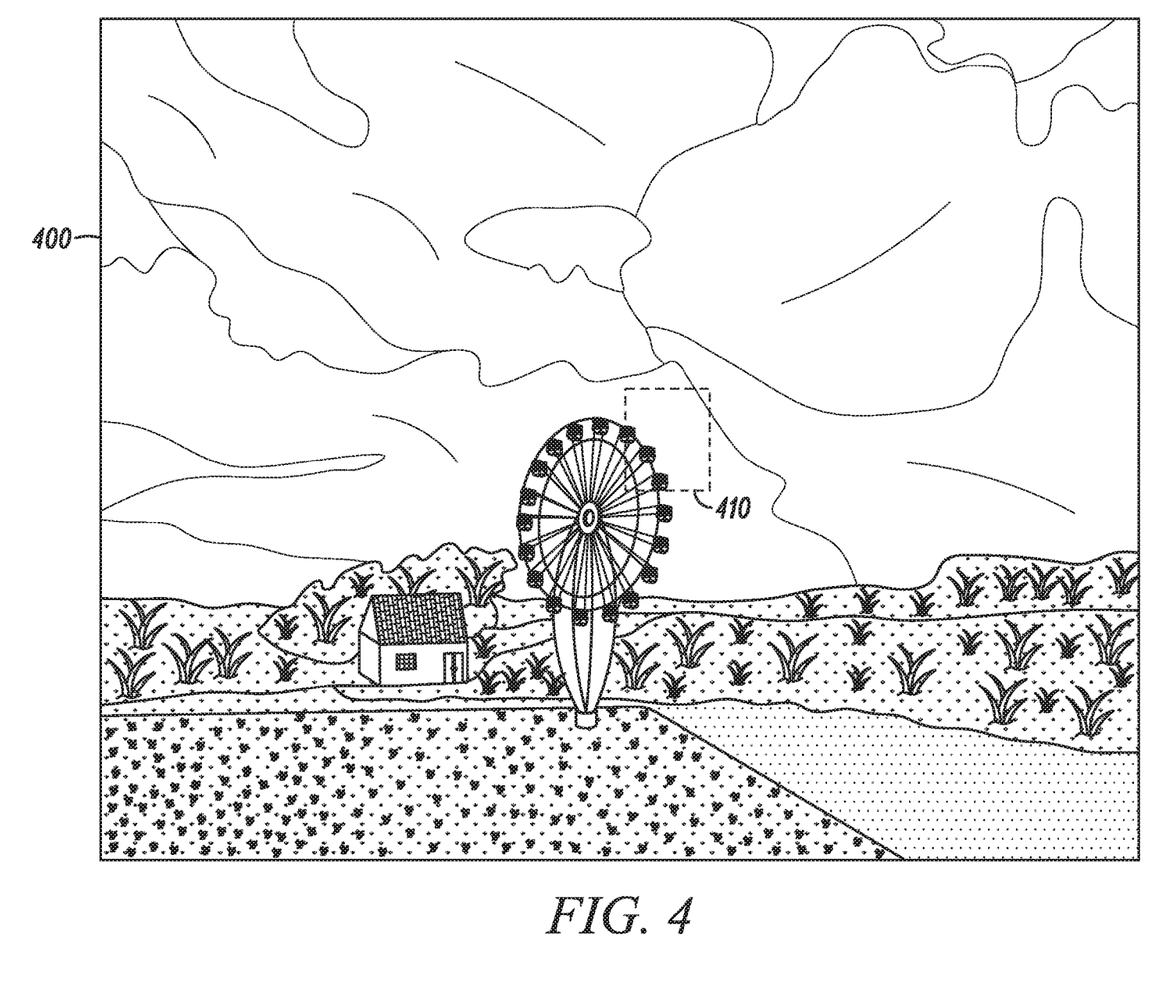
FIG. 4 shows one example of a single frame of an input video stream having a single ROI that has been identified by the vision enhancement system of FIG. 2.
Figure 5:
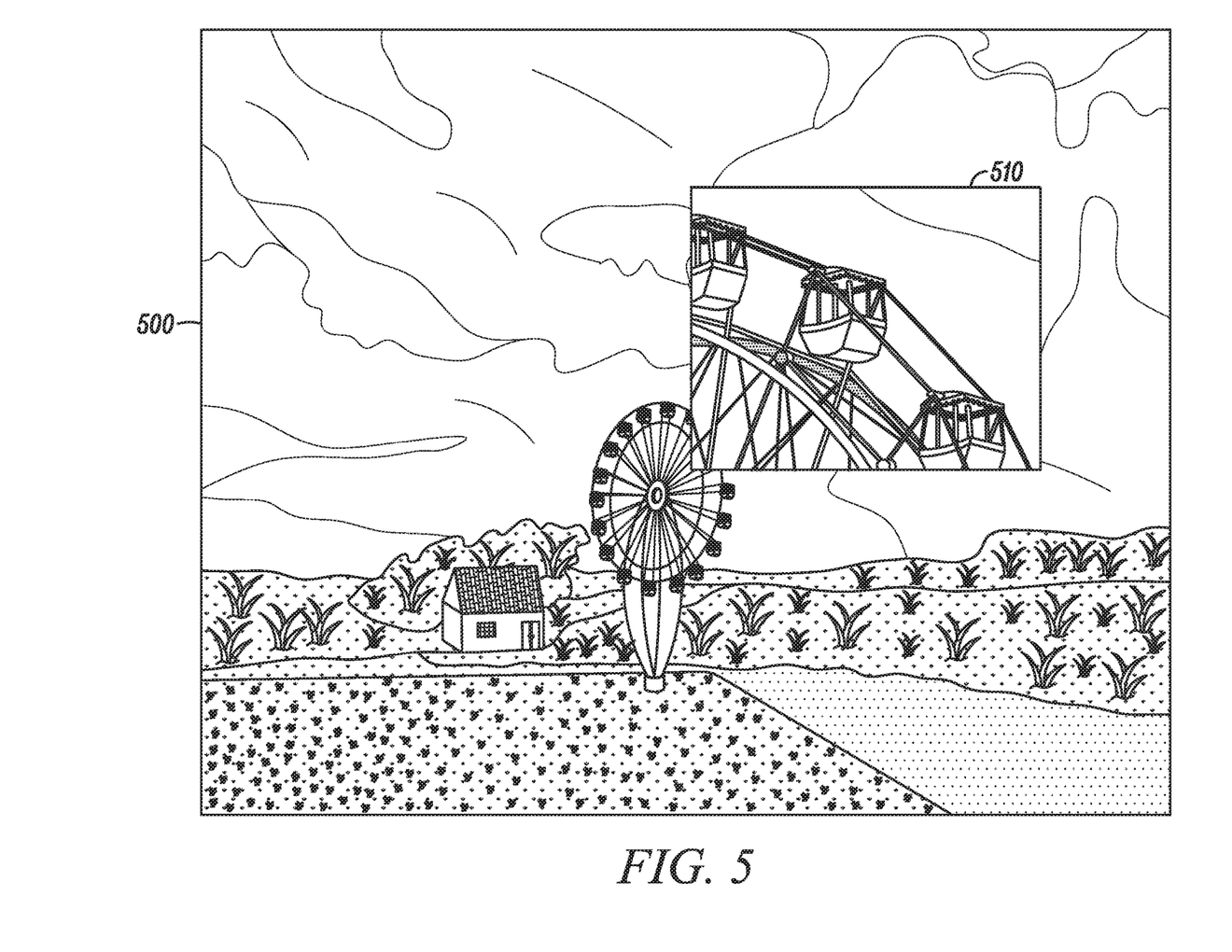
FIG. 5 shows one example of the resulting view frame shown in FIG. 4 after the ROI has been magnified.
Figure 6:
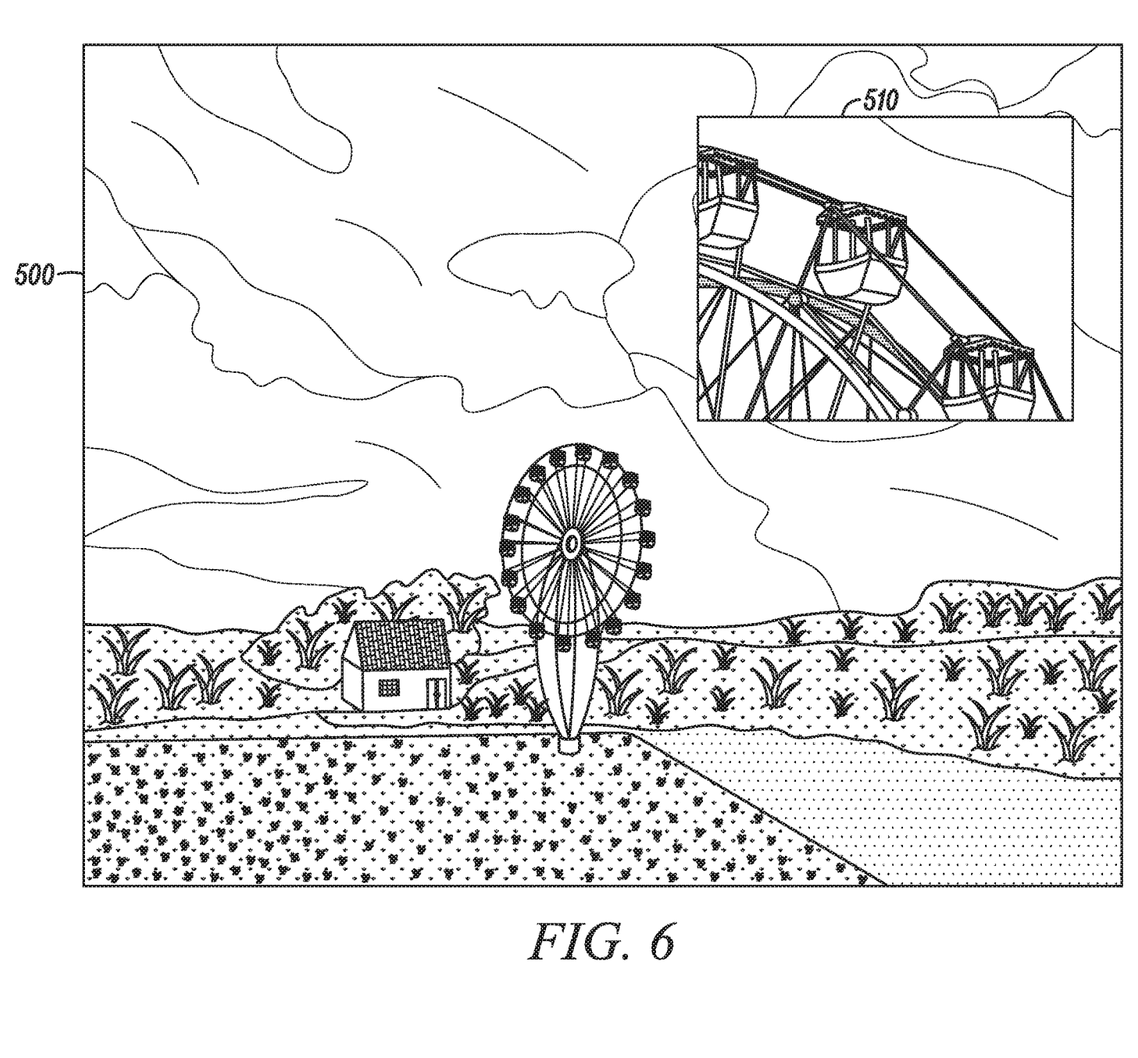
FIG. 6 shows another example of the resulting view frame shown in FIG. 4 after the ROI has been magnified.

FIG. 4 shows one example of a single frame 400 of an input video stream 225 that may be provided to the vision enhancement system 200 of FIG. 2. A ROI 410 has been identified by the video analytics system 210. FIG. 5 shows the corresponding resultant frame 500 in the modified video stream 225 that includes a magnified ROI, which is output by the vision enhancement system 200. As shown, the resultant frame 500 includes portions of the unmagnified image as they normally would be presented. Overlaid on this unmagnified image is the magnified ROI 510. In this embodiment, the center of the magnified ROI 510 coincides with the center of the non-magnified image within the same space. However, the magnified ROI can be positioned at different locations in the frame. One example of a different location is illustrated in the frame 600 of FIG. 6. In FIG. 6, the magnified ROI 610 previously established has been relocated or positioned at the upper left quadrant of the frame 600. In this example it is evident that there are portions of the image which are duplicated both in the magnified ROI 610 as well as in the unmagnified region. Whether this occurs, and to what extent depends on the size of the ROI, its placement, and the magnification that is to be imparted to the ROI. All of these parameters may be set by default or may be defined for each viewer as a settable parameter.

In some cases the amount of magnification that is provided to the ROI may be automatically and dynamically adjusted using, for example, machine learning techniques that train the magnification module 230 using suitably trained data. In some cases such automatic and dynamic adjustments may be only performed if the initial magnification level is a default value and not a viewer selected level. In other cases the dynamic and automatic adjustment may be itself a user settable parameter that can be turned on or off. By way of example, if a magnified ROI initially shows a closeup of two people sitting next to each other talking, showing only their heads and shoulders but without any of the surrounding environment, and then the scene cuts to show text on a note that one of the individuals is holding in their hand, the system could automatically zoom in to further magnify the text as large as possible while still fitting it on the display.

In some embodiments a panning function may be implemented that allows the ROI and the surrounding area to be panned to allow areas around the ROI to undergo magnification. In general, any panning, as well as magnification changes (zooming) should be performed smoothly and relatively unobtrusively. For example, in some cases the magnification level of the ROI may only be changed at a scene change.

As previously mentioned, various parameters such as selection of an ROI and the magnification level may be viewer settable. In this case the user interface (e.g., a remote control unit, a voice activated smart assistant such as Apple's Siri or Amazon's Alexa) can provide the viewer with the ability to establish the parameter values, possibly with the assistance of an interactive on-screen menu through which parameters can be set. In some embodiments the user interface may provide the viewer with an on-screen pointer that allows the viewer to select the object or other ROI they want to be magnified and tracked. After being selected the video tracker in the vision enhancement system may be used to automatically track the ROI as it moves.

If the viewer has the ability to pause the video content (as would be the case, for instance, when viewing content recorded on a DVR), via e.g., a pause button on a remote control unit, the viewer can first pause the video and then the on-screen pointer could be used to pan around the full image so that the viewer can continuously change the ROI that is being magnified, thereby allowing the viewer to scan the entire scene with increased magnification. In this way the viewer can simulate the movement of a magnifying glass lens over any and all desired portions of the image. For instance, in the example presented above in which a magnified ROI includes a note with text on it, the text may still be too small to read. In this scenario, the viewer could pause on the note, then increase the magnification using a zoom function and scan over the entire note before resuming play. Similarly, if the viewer can implement a rewind function, the viewer could replay scenes to view different ROIs from those that were previously seen or to view previously seen ROIs at different magnification levels.

As previously mentioned, in some embodiments the user interface may incorporate a voice activated smart assistant. Such a user interface may be particularly useful for visually impaired users who may have difficulty with typical on-screen graphical user interfaces. For instance, if the user desires to select as a ROI the magnified ROI 510 shown in FIG. 5, the user may simply provide a verbal command such as "Zoom in on the cars at the top of the Ferris wheel." Or likewise, in connection with FIGS. 5 and 6, the user may issue a verbal command such as "shift the magnified image to the top right corner." The voice activated smart assistant can also be used to control other functions and features such as the DVR controls (e.g., pause, rewind) and the like.

In some embodiments the magnified ROI may undergo additional visual enhancements to further enhance their viewability for visually impaired users. For example, the luminosity, contrast and/or color gamut of the magnified ROI may be increased relative to the remainder of the video. This may be particularly effective when used in conjunction with high dynamic range (HDR) content and HDR-equipped displays. HDR significantly increases the visual dynamic range and extends the maximum brightness. The increased dynamic range can be repurposed from its original intended use of providing a "high fidelity" rendering to instead produce a much brighter picture with higher contrast and lower dynamic range in the magnified ROI, while still presenting relevant distinguishing visual elements. Conversely, for a viewer with a low tolerance to light, the image rendering could be performed to dramatically reduce the contrast and overall dynamic range in the ROI to a low value, taking advantage of the low end (i.e., dark) of the dynamic range. In this way an image can be provided that may look dim and dull to a viewer with normal vision but which enables a highly light sensitive individual to enjoy content that would otherwise not be accessible to them.

In addition to accommodating visually impaired viewers who have a reduced or enhanced sensitivity to light, the magnified ROI may undergo other visual enhancements for viewers with different impairments. For example, a color-blind mode of operation may be offered in which visual enhancements are made such as color shifting and increased contrast between certain colors (e.g., red and green) in order to improve viewability for color blind viewers.

In some embodiments the visually impaired user can select the type of visual impairment they have and the visual enhancement provided will be determined based on the specified impairment type. For instance, if the viewer specifies color blindness, and further specifies the type of color blindness, the particular color corrected rendering of the content will be provided that is most suitable for that type. The corrections are generally enhancing and/or reducing certain colors to compensate for the viewer's deficiencies in this area.

Figure 7:
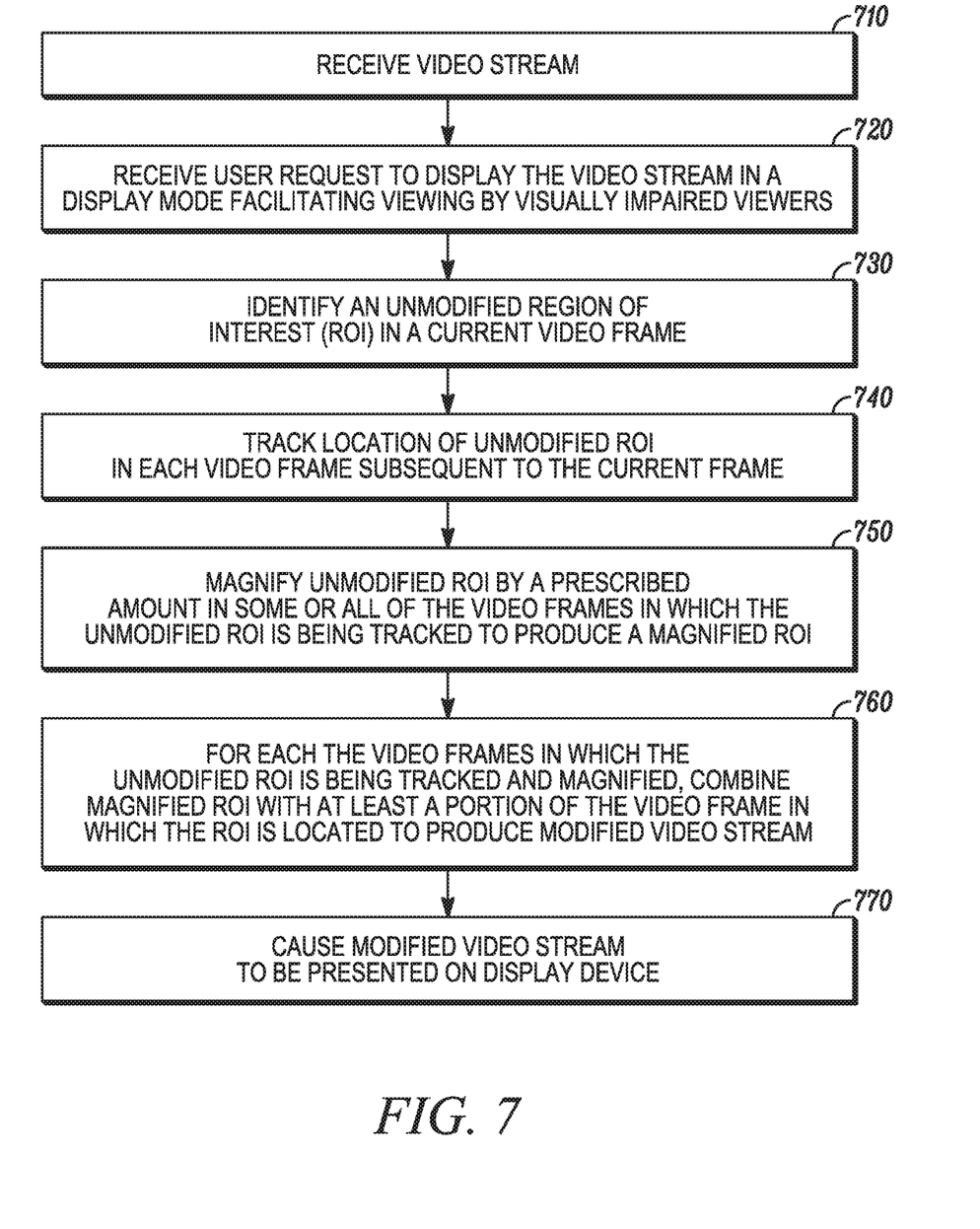
FIG. 7 is flowchart showing one example of a method for modifying a video stream for display on a display device.

FIG. 7 is flowchart showing one example of a method for modifying a video stream for display on a display device. The method begins at block 710 when the vision enhancement receives a video stream and continues at block 720 where a user request is received by the vision enhancement system to display the video stream in a display mode that facilitates viewing by visually impaired viewers. An unmodified region of interest (ROI) is identified in a current video frame of the video stream at block 730. The identification may be performed automatically by the vision enhancement system or manually by the user. At block 740, the vision enhancement system tracks a location of the unmodified ROI in each of the video frames of the video stream subsequent to the current frame. The vision enhancement system at block 750 magnifies the unmodified ROI by a prescribed amount in some or all of the video frames in which the unmodified ROI is being tracked to produce a magnified ROI corresponding to an unmodified ROI. At block 760, for each of the video frames in which the unmodified ROI is being tracked and magnified, the vision enhancement system combines the magnified ROI with at least a portion of the video frame in which the ROI is located to thereby produce a modified video stream. For instance, in some cases the magnified ROI may be overlaid over at least a portion of the corresponding unmodified ROI. The vision enhancement system then causes the modified video stream to be presented on a display device at block 770

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or functional block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between to or more computers. All functions performed by the various components, modules, engines, systems, apparatus, interfaces or the like may be collectively performed by a single processor or each component, module, engine, system, apparatus, interface or the like may have a separate processor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein may be combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

The invention claimed is:

1. A method for modifying a video stream for display on a display device, comprising:
   receiving a request at a vision enhancement system to display a video stream in a display mode that facilitates viewing by visually impaired viewers;
   identifying an unmodified region of interest (ROI) in a current video frame of the video stream;
   tracking, with the vision enhancement system, a location of the unmodified ROI in each of the video frames of the video stream subsequent to the current frame;
   magnifying, with the vision enhancement system, the unmodified ROI by a prescribed amount in at least some of the video frames in which the unmodified ROI is being tracked to produce a magnified ROI corresponding to an unmodified ROI;
   for each of the video frames in which the unmodified ROI is being tracked and magnified, combining, with the vision enhancement system, the magnified ROI with at least a portion of the video frame in which the ROI is located to thereby produce a modified video stream; and
   causing, with the vision enhancement system, the modified video stream to be presented on a display device; where
   the vision enhancement system includes a trained, automated neural network that automatically identifies the unmodified ROI using an audio component of the video stream.

2. The method of claim 1, wherein combining, with the vision enhancement system, the magnified ROI with at least a portion of the video frame in which the ROI is located includes overlaying the magnified ROI over at least a portion of the corresponding unmodified ROI.

3. The method of claim 1, wherein identifying the unmodified ROI includes receiving viewer input that identifies the unmodified ROI in the video stream.

4. The method of claim 3, wherein the viewer input is received through a voice-activated smart assistant or a viewer-interactive on-screen pointer overlaid on a presentation of the video stream on the display device.

5. The method of claim 1, wherein magnifying the unmodified ROI further comprises magnifying the unmodified ROI by a default amount.

6. The method of claim 1, further comprising receiving user input specifying a magnification level and magnifying the unmodified ROI by the specified magnification level.

7. The method of claim 1, wherein identifying the unmodified ROI further includes classifying the unmodified ROI as belonging to a class based on a type of content identified in the unmodified ROI.

8. The method of claim 7, further comprising comparing the class in which the unmodified ROI has been classified to a predetermined list of ROI classes and only performing the tracking and magnifying of the unmodified ROI if the class is included on the predetermined list of ROI classes.

9. The method of claim 1, wherein the combining includes centering the magnified ROI over a center of the unmodified ROI in the modified video stream.

10. The method of claim 1, wherein the combining includes offsetting a center of the magnified ROI from a center of the unmodified ROI in the modified video stream.

11. The method of claim 1, further comprising automatically and dynamically adjusting, without user intervention, the prescribed amount of magnification by which the unmodified ROI is magnified.

12. The method of claim 1, further comprising visually enhancing the magnified ROI for enhanced viewability by visually impaired viewers.

13. The method of claim 1, wherein visually enhancing the magnified ROI includes changing a value of at least one video parameter selected from the group consisting of luminosity, contrast and color gamut.

14. The method of claim 13, further comprising receiving user input specifying a type of visual impairment for which viewability of the video stream is to be enhanced, wherein changing a value of at least one parameter includes changing the at least one value based on the type of visual impairment.

15. A vision enhancement system for modifying a video stream for display on a display device, comprising:
 a vision analytics system configured to receive a request to display a video stream in a display mode that facilitates viewing by visually impaired viewers, the vision analytics system including:
  a region of interest (ROI) detection system configured to identify an unmodified ROI in a current video frame of the video stream; and
  an ROI tracking system configured to track a location of the unmodified ROI in each of the video frames of the video stream subsequent to the current frame;
 a region magnification module configured to magnify the unmodified ROI by a prescribed amount in at least some of the video frames in which the unmodified ROI is being tracked to produce a magnified ROI corresponding to an unmodified ROI; and
 an image combining module configured to combine, for each of the video frames in which the unmodified ROI is being tracked and magnified, the magnified ROI with at least a portion of the video frame in which the magnified ROI is located to thereby produce a modified video stream; where
 the vision enhancement system includes a trained, automated neural network that automatically identifies the unmodified ROI using an audio component of the video stream.

16. The vision enhancement system of claim 15, wherein the image combining module is further configured to combine the magnified ROI with at least a portion of the video frame in which the ROI is located includes overlaying the magnified ROI over at least a portion of the corresponding unmodified ROI.

17. The vision enhancement system of claim 15, wherein the vision analytics system is further configured to classify the unmodified ROI as belonging to a class based on a type of content identified in the unmodified ROI.

18. The vision enhancement system of claim 15, wherein the region magnification module is further configured to automatically and dynamically adjust, without user intervention, the prescribed amount of magnification by which the unmodified ROI is magnified.

* * * * *